United States Patent [19]

Sugimoto et al.

[11] 4,282,957
[45] Aug. 11, 1981

[54] SUB-TRANSMISSION CONTROL SYSTEM FOR PROVIDING ENGINE BRAKING

[75] Inventors: Hiroshi Sugimoto, Aichi; Jiro Nakano, Okazaki, both of Japan

[73] Assignee: Toyota Jidosha Kogyo Kabushiki Kaisha, Toyota, Japan

[21] Appl. No.: 70,696

[22] Filed: Aug. 29, 1979

[30] Foreign Application Priority Data

Oct. 9, 1978 [JP] Japan .............................. 53-124382

[51] Int. Cl.³ ...................... B60K 41/20; F16H 37/00
[52] U.S. Cl. .................................... 192/9; 192/0.094; 192/3.52; 74/740
[58] Field of Search ............. 192/1, 4 A, 0.055, 0.076, 192/0.094, 3 M, 9, 13 R, 18 A, 18 B, 3.52, 3.58; 74/782, 781 R, 752 D, 740, 866

[56] References Cited

U.S. PATENT DOCUMENTS

| 2,872,000 | 2/1959 | Herndon et al. ..................... 192/4 A |
| 3,477,313 | 11/1969 | Ringe ................................. 192/18 A |
| 3,523,597 | 8/1970 | Lemieux ............................. 192/4 A |
| 3,684,066 | 8/1972 | Kubo et al. ......................... 192/4 A |
| 4,039,061 | 8/1977 | Pruvot et al. ....................... 192/4 A |
| 4,142,613 | 3/1979 | Iijima ................................ 192/4 A |
| 4,181,204 | 1/1980 | Ito .................................... 192/4 A |

Primary Examiner—George H. Krizmanich
Attorney, Agent, or Firm—Finnegan, Henderson, Farabow, Garrett & Dunner

[57] ABSTRACT

In a vehicle equipped with a main transmission and, in series with it, a sub-transmission which has two speed stages, wherein the sub-transmission is automatically controlled by a main control system of a sub-transmission control system according to various operating parameters of the vehicle and the engine of the vehicle, it is proposed further to provide a sub-control system which is fed with a signal which indicates operation of the braking system of the vehicle, and which generates, when the braking system of the vehicle has been operating for longer than a first predetermined time, a shiftdown signal, which is fed to the main control system so as to override it, and so as to shift the sub-transmission positively into its lower speed stage, so as to provide good engine braking. It is further proposed to so arrange the sub-control system that, when the braking system of the vehicle is in operation, and then is put out of operation for a time which is shorter than a second predetermined time, the shiftdown signal is continuously produced without interruption.

4 Claims, 4 Drawing Figures

SUB-TRANSMISSION CONTROL SYSTEM FOR PROVIDING ENGINE BRAKING

BACKGROUND OF THE INVENTION

The present invention relates to the field of vehicle transmission systems, and more particularly relates to the field of automatic control of secondary transmission systems which are mounted to vehicles in series with primary transmission systems. In particular, the present invention relates to a control system for a sub-transmission, of a vehicle, which enables good engine braking to be obtained while driving the vehicle.

It has been conventionally well known, and practiced, to provide a vehicle, which is equipped with a primary transmission system which is changed over by hand, with a secondary transmission or sub-transmission mounted in series with the main transmission, said sub-transmission being changed over between two gearing ratios by hand, independently of said primary transmission. However, although such a combination has the advantage that, by it, many steps of speed change, i.e. many overall gearing ratios, can be provided, and although thereby it is possible to operate the vehicle so as to obtain good fuel economy and high smoothness of running of the vehicle, it has the disadvantage that operation by hand of both the primary transmission and the sub-transmission is a difficult process. The proper synchronization of the operation by the driver of a hand gear changing mechanism for the primary transmission and of another hand gear changing mechanism for the sub-transmission is time-consuming, may distract the driver's attention from road conditions, thus perhaps even causing a serious accident, and further may not be performed adequately at a crucial moment, due to the pressure of circumstances requiring the driver's attention, thus resulting in inefficient or unsmooth operation of the vehicle. Thus, if this system is to be used, the driver must be specially trained.

To solve this problem, it has been formerly proposed to provide a sub-transmission gear changing system which is automatically and electrically controlled, not depending directly upon the will of the driver, but according to various combinations of operating parameters of the vehicle and of its engine, so that the driver may only control manually the operation of the primary or main transmission, and the operation of the sub-transmission is performed automatically between its high and its low gearing ratios.

In a vehicle which is equipped with a manual transmission, it is often very helpful for driving the vehicle to take advantage of so-called engine braking by, at the appropriate time, downshifting the transmission, so that, when the vehicle is decelerated, a larger part of the decelerating impetus is provided, not from the braking system of the vehicle, but from overrunning the engine of the vehicle, so as to operate it as a pump at a higher rate and thereby dissipate a larger amount of energy of motion of the vehicle in friction and hydraulic compression losses. Such a form of deceleration is particularly valuable in wet or icy road conditions, because of its progressive and anti-skid nature. However, it has been a disadvantage up until now of the above outlined system of controlling a sub-transmission automatically that, when the vehicle is decelerated, sometimes engine braking effect is not good; indeed, due to closing of the throttle of the vehicle during braking, sometimes the sub-transmission may even shift to its higher gearing ratio, thereby actually diminishing the engine braking effect. Therefore, up until now, good engine braking effect has not been obtainable from a vehicle equipped with a manual transmission and an automatically controlled sub-transmission, and this has been a significant reason militating against their acceptability to the general public.

SUMMARY OF THE INVENTION

Therefore, it is an object of the present invention to provide a system for controlling automatically the sub-transmission of a vehicle which is also equipped with a main transmission, which allows for and provides a good engine braking effect.

According to the present invention, this object is accomplished by, in a vehicle which comprises: an engine, a transmission which receives rotary power from the engine, and which has a plurality of speed stages, a sub-transmission which receives rotary power from the transmission, and which transmits it to drive the vehicle, and which has a higher speed stage which provides a certain gearing ratio from its input to its output, and a lower speed stage which provides a lower gearing ratio than this certain gearing ratio, and a braking system: a sub-transmission control system which includes a main control system which controls automatically the shifting of the sub-transmission between its higher and its lower speed stage, depending on ongoing sensed operating parameters of the vehicle; and a sub-control system which is fed with a signal which indicates operation of the braking system of the vehicle, and which outputs an engine braking shiftdown signal during the operation of the braking system of the vehicle, after this operation has continued for more than a certain predetermined time; said engine braking shiftdown signal being fed to the main control system so as to override it, and to shift the sub-transmission positively into the lower speed stage.

Practically speaking, the engine braking effect is not required when the brake pedal is only depressed for a short time. That is, only when the vehicle is being decelerated substantially, for a period longer than the aforementioned certain predetermined time, is the engine braking shiftdown signal fed to the subtransmission control system so as to override it, and thus, if only a transient operation of the brake is made, the engine braking control system does not operate.

Further, according to a certain particular feature of the present invention, the previously defined subtransmission control system may further make the engine braking shiftdown signal, if once produced, continue for another certain predetermined time after cession of the operation of the braking system of the vehicle, so that, if the braking system of the vehicle is re-operated before the expiration of said another certain perdetermined time, the engine braking shiftdown signal is output continuously without a break.

This is provided for the reason that, if the vehicle is once substantially braked for longer than the said certain predetermined time, so that the engine braking shiftdown signal is generated by the engine braking control system, then, if the brake pedal is released for only a short time and then is reapplied, it is desirable that the engine braking should continue without interruption. Thus, the release of the brake pedal for less than the said another predetermined time does not affect the engine braking control system, or does not cause it to interrrupt or cease its operation of generating the engine braking shifdown signal.

BRIEF DESCRIPTION OF THE DRAWINGS

The present invention will become more fully understood from consideration of the following description of a preferred embodiment, and from the accompanying drawings. It should be clearly understood, however, that the explanation of the embodiment, and the drawings, are given for the purposes of elucidation and explanation only, and are not in any way to be taken as limiting the scope of the present invention, or of the protection sought to be granted by Letters Patent, which are to be defined solely by the claims. In the drawings:

DESCRIPTION OF THE PREFERRED EMBODIMENT

Figure 1:
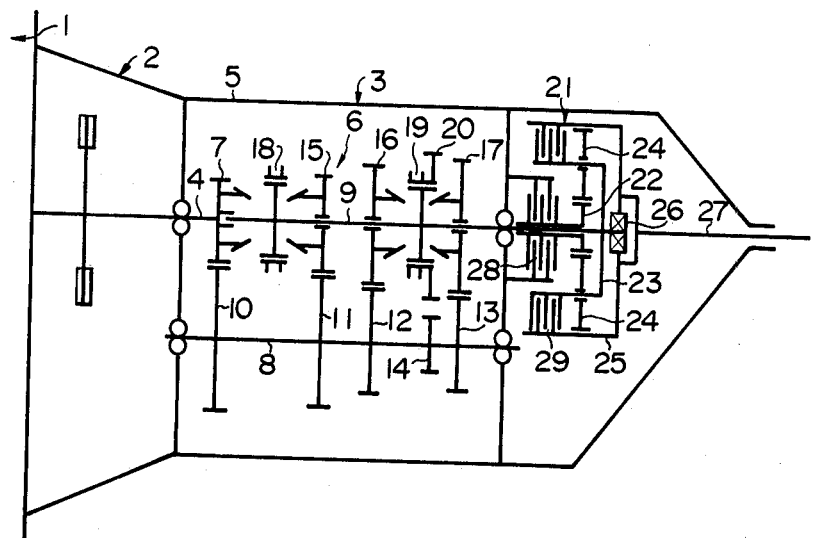
FIG. 1 is a skeleton sectional view of the mechanical parts of a transmission and of a sub-transmission, which are to be controlled by the control system of the present invention.

Referring now to the drawings, FIG. 1 shows in a skeleton form a transmission equipped with a sub-transmission, which is controlled by a control system according to the present invention. In this figure, 1 designates schematically an engine which provides power which is to be transmitted by the transmission and sub-transmission. The torque and rotary power provided by the engine 1 are transmitted through the clutch means 2 to the input shaft 4 of the variable gear ratio transmission 3. The case of this variable gear ratio transmission 3 is designated as 5, and this case 5 contains the main gear changing mechanism 6, which is the main gear changing system of the transmission, and is of a per se well known four forward and one reverse speed type. Further, the case 5 of the variable gear ratio transmission 3 contains the sub-gear change system 21, which is a two-gear type sub-transmission of the planetary gear type.

The input shaft 4 is rotatably held in the case 5, and on the right hand end in the figure of the input shaft 4 it supports a gear wheel 7 in a fixed manner. Below the input shaft 4 in the figure is supported rotatably in the case 5 a counter shaft 8, and collinearly with the input shaft 4, further, a drive or output shaft 9 is supported rotatably in the case 5.

On the counter shaft 8 are mounted in a fixed manner five gear wheels, designated in order from the left to the right in the figure as 10, 11, 12, 14, and 13, all of which in general have different numbers of gear teeth. Of these, the left hand one 10 in the figure engages the gear wheel 7 always, and thereby the drive or input shaft 4 provides rotary power, via the gear wheels 7 and 10, to the counter shaft 8.

The output shaft 9 has rotatably mounted on it in order, from the left to the right in the figure, gear wheels 15, 16, and 17. Respectively, the gear wheel 15 always engages with the gear wheel 11 on the counter shaft 8, the gear wheel 16 always engages with the gear wheel 12, and the gear wheel 17 always engages with the gear wheel 13. Thus, each of these gear wheels 15, 16, and 17 is always supplied with rotary power by its corresponding gear wheel on the counter shaft 8.

Between the gear wheels 7 and 15 the 3-4 synchronizer 18 is provided, and between the gear wheels 16 and 17 the 1-2 synchronizer 19 is provided. These synchronizers may be of a per se well known type such as the Borg-Warner type. When the hub sleeve of the 3-4 synchronizer 18 is shifted lefward in the figure, the input shaft 4 and the output shaft 9 are directly connected, and the fourth or direct speed is obtained, and when the hub sleeve of the 3-4 synchronizer 18 is shifted rightward in the figure, the gear wheel 15 is connected to the output shaft 9, and thereby the output shaft is driven by the input shaft 4 through the gear wheels 7, 10, 11, and 15 in that order, whereby third speed is obtained; these conditions of course with the 1-2 synchronizer 19 in its middle position as shown in the figure, wherein it engages neither of the gear wheels 16 or 17 with the output shaft 9. On the other hand, when the hub sleeve of the 3-4 synchronizer 18 is in its middle position as shown in the figure, wherein it engages neither of the gear wheels 7 or 15 with the output shaft 9, then, when the hub sleeve of the 1-2 synchronizer 19 is shifted to the left in the figure, the gear wheel 16 is connected to the output shaft 9, and thereby the output shaft 9 is driven from the input shaft 4 through the gear wheels 7, 10, 12, and 16 in that order, whereby second speed is obtained; whereas, when the hub sleeve of the 1-2 synchronizer 19 is shifted to the right in the figure, the gear wheel 17 is connected to the output shaft 9, and thereby the output shaft 9 is driven from the input shaft 4 through the gear wheels 7, 10, 13, and 17 in that order, whereby first speed is obtained.

Further, the 1-2 syncrhonizer 19 is fitted with the reverse gear 20 in its hub sleeve, and this is a reverse gear which engages selectively with a reverse idler gear which is not shown in the drawing. This reverse idler gear is always engaged with the gear wheel 14. Thus, when the engagement of the reverse gear 20 is made with the reverse idler gear, reverse speed is obtained.

The movement of the 1-2 synchronizer 19 and the 3-4 synchronizer 18, and the engagement of the reverse gear 20 with the reverse idler gear, are performed by means of a manual shift lever and selectors of a per se well known sort, not shown in the drawing.

Now the sub-transmission 21 will be described. Basically, the sub-transmission 21 is fitted with a sun gear 22 which is rotatably fitted on the output shaft 9 of the main transmission, a plurality of planetary pinions 24 which mesh with the sun gear 22, and are carried on a planetary carrier 23, and a ring gear 25 which meshes with the planetary pionions 24. The planetary carrier 23 is connected fixedly to the output shaft 9, and the ring gear 25 is connected to the output shaft 9 by a one-way clutch 26, and is also further connected to the power output shaft 27 of the sub-transmission 21.

This one way clutch 26 is so arranged that, if the output shaft 9 attempts to turn faster than the rotational speed of the ring gear 25, it engages and prevents this; while, if on the other hand the output shaft 9 attempts to turn slower than the rotational speed of the ring gear 25, then the one way clutch 26 allows this to occur.

Further, the sub-transmission 21 is fitted with a brake means 28 and a clutch means 29. The brake means 28 is arranged so that it can connect selectively the sun gear 22 and the casing 5 of the transmission, while the clutch means 29 is arranged so that it can connect selectively the planetary carrier 23 and the ring gear 25. The brake means 28 and the clutch means 29 are respectively operated by the brake solenoid 30 and the clutch solenoid 31, which are not shown in FIG. 1, but are diagrammatically shown in FIG. 2.

The operation of such a sub-transmission is per se well known. If the brake solenoid 30 is supplied with power, and the clutch solenoid 31 is not supplied with power, then the brake means 28 is actuated, while the clutch means 29 is not actuated. Thereby the sun gear 22 is fixed. Thus the rotary power provided by the output shaft 9 is delivered to the power output shaft 27 by way of the planetary carrier 23, the planetary pinions 24, and the ring gear 25, thus providing an increase of rotational speed. On the other hand, if the brake solenoid 30 is not supplied with power, while the clutch solenoid 31 is supplied with power, then the brake means 28 is not actuated, while the clutch means 29 is actuated. Thereby, the planetary carrier 23 is connected with the ring gear 25, and the sub-transmission 21 is in the directly connected stage, with no increase of rotation speed between the output shaft 9 and the power output shaft 27.

Figure 2:
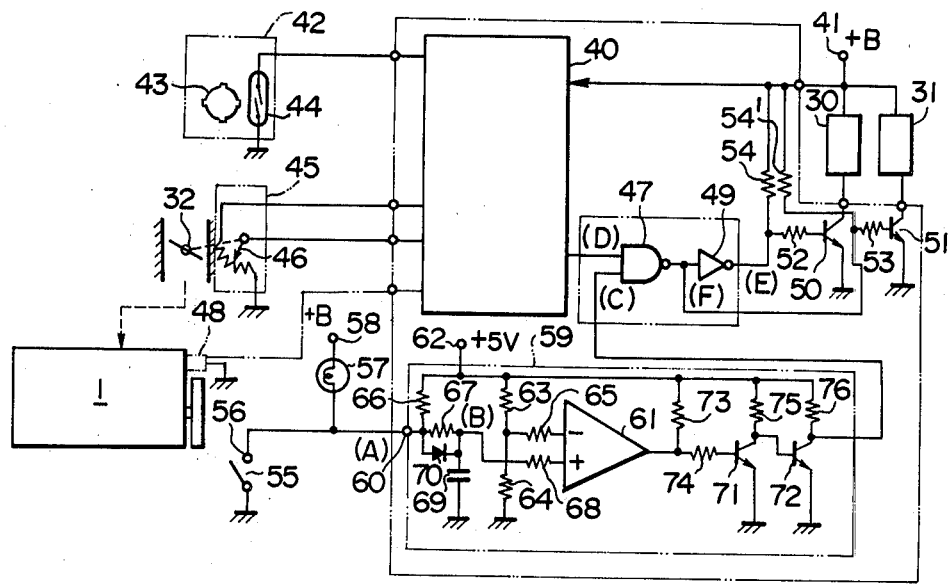
FIG. 2 is a partly schematic electric circuit for the sub-transmission control system and the engine braking control system of the present invention.

In FIG. 2, the switching control system according to the present invention, which controls the sub-transmission 21 according to the operational state of the vehicle, is shown in diagrammatical form. This switching control system is built around the computing control means 40, which is in this embodiment an integrated circuit of a per se well known type, and which is supplied with direct current electrical power for opertion by a source which is not shown in the figure but which provides the direct current through its positive terminal 41. Into this computing control means 40 are input a speed signal which is output from a vehicle speed signal generating means 42, and a throttle signal which is output from a throttle signal generating means 45, which are respectively representative of the vehicle speed moment by moment, and the vehicle throttle opening (i.e., engine load) moment by moment. Depending on the values of these two signals, the computing control means 40 outputs a speed change signal to the NAND gate 47, as shown in FIG. 3 and explained hereinafter.

The vehicle speed signal generating means 42 in this embodiment contains a magnet rotor 43 and a reed switch 44 which is in close proximity to the magnetized lobes of the magnet rotor 43. The magnet rotor 43 is rotated at a rotational speed which is proportional to the vehicle speed, and thus the vehicle speed signal generating means 42 outputs a pulse signal which is proportional in its frequency to the vehicle speed.

On the other hand, the throttle signal generating means 45 outputs a variable voltage signal. That is to say, the throttle signal generating means 45 is organized as a variable resistance whose rotatable contact electrode 46 rotates according to the opening and closing of the throttle valve of the vehicle, thus generating a variable output voltage in a per se well known way.

Figure 3:
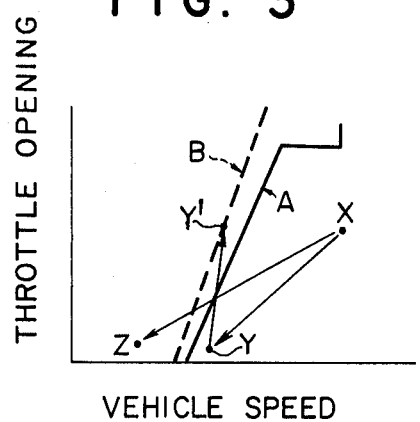
FIG. 3 is a diagram of vehicle speed against throttle opening, for explaining the operation of the control system of the present invention.

In FIG. 3, which is a figure for illustrating the system of speed changing performed by the computing control means 40, the solid line A indicates the boundary between the region wherein the sub-transmission 21 is to be left in the directly connected speed stage, to the region in which it is to be shifted from the directly connected stage to the increasing speed stage, as a relation between vehicle speed and throttle opening; and, on the other hand, the dotted line B indicates the boundary between the region wherein the sub-transmission 21 is to be left in the increasing speed stage, and the region in which it is to be shifted from the increasing speed stage to the directly connected stage. That is to say, if the sub-transmission 21 is currently in the directly connected speed range, then, if the point in FIG. 3 which corresponds to the current values of vehicle speed and throttle opening is to the left of line A in FIG. 3, then the sub-transmission 21 is to be left in the directly connected speed stage; but, on the other hand, if this point is to the right of line A, then the sub-transmission 21 is to be shifted up from the directly connected speed stage to the increasing speed stage. On the other hand, if the sub-transmission 21 is currently in the increasing speed stage, then, if the point in FIG. 3 which corresponds to the current values of vehicle speed and throttle opening is to the left of line B in FIG. 3, then the sub-transmission 21 is to be shifted down from the increasing speed stage to the directly connected speed stage; and on the other hand if this point is to the right of line B, then the sub-transmission 21 is to be left in the increasing speed stage. By the fact that the lines A and B do not coincide, therefore, a hysteresis is allowed for in the operation of the sub-transmission, which ensures stable operation thereof without erratic and repeated changes of range in the boundary region, depending upon slight changes in the operating conditions of the vehicle. The lines A and B are programmed into the computing control means, which thus implements the diagram of FIG. 3.

It is clear from FIG. 3 that the computing control means 40 is adapted to output the shift-down signal, which in this embodiment is a "0" signal, when the vehicle speed is lower than a certain amount, irrespective of the throttle opening; and further that the computing control means 40 is adapted to output the shift-up signal, which in this embodiment is a "1" signal, when the vehicle speed increases above a certain amount, provided that the throttle opening is lower than a certain amount.

As one of many possible alternatives, it would be quite within the scope of the present invention for the shift-up signal and the shift-down signal to be produced by the computing control means 40 from a different shift diagram, similar to FIG. 3, but plotting throttle opening against engine revolution speed; and in fact an engine revolution speed sensor 48 is shown in FIG. 2 as supplying an engine revolution speed signal to the computing control means 40, which is representative of the engine revolution speed.

The shift signal from the computing control means 40 is output to the NAND gate 47, and the output of the NAND gate 47 is input to the NOT gate 49, and also, via a resistance element 53, to the base element of the transistor 51, which controls the supply of electricity to the clutch solenoid 31. Further, the output of the NOT gate 49 is input through the resistance element 52 to the base element of the transistor 50, which controls the supply of electricity to the brake solenoid 30. Further, to the base elements of these transistors 50 and 51 is supplied electricity from the positive terminal 41 of the battery of the vehicle, via resistance elements 54 and 54' respectively, and further through the resistance elements 52 and 53, respectively.

Therefore, the brake solenoid 30 is supplied with electricity for operation when the output signal of the NAND gate 47 is "0," and when the output signal of the NAND gate 47 is "1" it is not supplied with electricity. Also, the clutch solenoid 31 is not supplied with electricity when the output signal of the NAND gate 47 is "0," and is supplied with electricity when the output signal of the NAND gate 47 is "1." Thus, the subtransmission 21 is shifted to the increasing speed range when the output signal of the NAND gate 47 is "0," and is shifted to the directly connected stage when the output signal of the NAND gate 47 is "1."

The present invention is particularly connected with the engine braking control system 59, whose output signal is the other signal fed to the NAND gate 47, so as to be NANDed with the output of the computing control means 40. The engine braking control system 59 is fed with a signal from the usual brake switch 55, which has a pair of contacts which are closed when the brake pedal (not shown in the figures) is depressed sufficiently to acutate the braking system of the vehicle. The one side of the brake switch 55 is connected to earth, while the other side 56 is connected, via a brake lamp or lamps 57, to an electric source 58, so that when the brake switch 55 is closed by actuation of the brake pedal of the vehicle, the brake lamp or lamps 57 lights up; but when the brake switch 55 is not closed, this lamp or lamps remains unlit.

This point 56 is further connected to the junction 60 of the engine braking control system 59. This engine braking control system 59 has a comparator 61, and to the negative terminal of this comparator 61 is supplied, through resistance element 65, a certain threshold voltage which is obtained from a voltage source 62 by tapping between resistances 63 and 64, through which the voltage from this voltage source 62 is led to earth. Further, to the positive terminal of this comparator 61 is supplied electricity from the voltage source 62, through a resistance 68, a resistance 67, and a resistance 66. The voltage level of this electricity supplied to the positive terminal of the comparator 61 is changed depending upon the state of charging of the condenser 69, and it is so arranged that when this condenser 69 is fully charged this voltage is higher than the aforementioned threshold voltage which is being supplied to the negative terminal of the comparator 61. The condenser 69 is supplied with electricity when the brake switch 55 is open, from the electric source 62, through the resistance 66 and the diode 70, and is thereby charged up. On the other hand, when the brake switch 55 is closed, the charge in the condenser 69 is discharged through the resistance 67 to earth. The rate of decrease of the voltage at the positive terminal of the comparator 61, due to the discharge of the charge in the condenser 69, is therefore determined by the value of the resistance 67.

Thus, the comparator 61, when the voltage at its positive terminal is higher than the voltage at its negative terminal, which is the threshold voltage, outputs a "1" signal; but, when the voltage at its positive terminal is less than the threshold voltage, it outputs a "0" signal. The output signal of this comparator 61 is input to the NAND gate 47 through a per se well known form of amplifying circuit which comprises transistors 71 and 72 and resistances 73, 74, 75, and 76.

Therefore, the NAND gate 47 outputs a "0" signal only when its two terminals both receive a "1" signal; in other words, when the computing control means 40 outputs a "1" signal, which is the shiftup signal, and also the engine braking control system 59 outputs a "1" signal, i.e., does not output a shiftdown "0" signal. In this case, the brake solenoid 30 is supplied with electricity, and the clutch solenoid 31 is not supplied with electricity, so that the sub-transmission 21 is put in the increasing speed range, because the sun gear 28 is fixed. On the other hand, when one or the other or both of the inputs to the NAND gate 47 is "0," then this NAND gate 47 outputs a "1" signal. This may happen either when the computing control means 40 outputs a "0" signal—i.e., a shiftdown signal—or alternatively when the engine braking control system 59 outputs a shiftdown signal. In this case, supply of electricity to the brake solenoid 30 is stopped, and the clutch solenoid 31 is supplied with electricity, and thereby the brake 28 of the sub-transmission 21 is de-activated, while the clutch 29 is activated. Thereby the planetary carrier 23 and the ring gear 25 are connected, and the subtransmission 21 is put into the directly connected stage.

Figure 4:
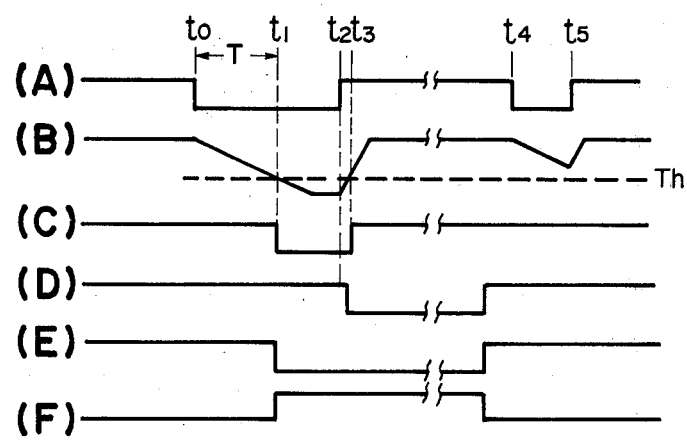
FIG. 4 is a time chart of various voltages and signals present in the system of FIGS. 1 and 2, during one long and one shorter application of the braking system of the vehicle, for explanation by way of example.

Now the explanation of the changeover system when the brake of the vehicle is applied will be explained, with reference to FIGS. 3 and 4. In FIG. 4 there is shown a time chart of changeover signals, wherein A is the brake signal, B is the input signal to the positive terminal of comparator 61, C is the output signal of the engine braking control system 59, D is the output signal of the computing control means 40, E is the output signal of the NOT gate 49 (which is the operating signal for the brake solenoid 30), and F is the output signal of NAND gate 47 (which is the operating signal for the clutch solenoid 31).

At the time point t0 the brake pedal is pressed, and therefore the brake switch 55 is closed. So at this time the condenser 69 starts to discharge through the resistor 67, and therefore the voltage B supplied to the positive element of the comparator 61 gradually decreases. At time point t1, which is a time T after the time point t0, this voltage B becomes lower than the threshold voltage Th which is supplied to the negative element of the comparator 61, as detailed above. Therefore, the comparator 61, which up until now has been outputting a "1" signal, starts to output a "0" signal, and therefore a "0" signal is output to NAND gate 47. Therefore, NAND gate 47 outputs a "1" signal even if a shiftup signal is supplied from the computing control means 40. In this way, when the brake pedal is pushed for more than a certain time T, the NAND gate 47 outputs a "1" signal irrespective of the output signal of the computing control means 40, and therefore the supply of electricity to the brake solenoid 30 is positively stopped, and the supply of electricity to the clutch solenoid 31 is positively performed. Thereby, if such was not already the case, the brake system 28 is released, the clutch system 29 is operated, and the sub-transmission 21 is shifted down from the increasing speed stage to the direct connection stage. Therefore, the engine braking effect is increased and is made better use of.

At the time point T2 the brake pedal is released, and the brake switch 55 opens. Thereby electricity is supplied to the condenser 69, and the positive terminal of the comparator 61 is supplied with more and more voltage. At the time point t3 this voltage at the positive terminal of the comparator 61 becomes higher than the threshold voltage Th, and accordingly the comparator 61 starts to output a "1" signal again, and NAND gate 47 is supplied with this "1" signal. Meanwhile, suppose that the speed and throttle opening of the vehicle have changed from, say, the speed and throttle opening at the point X to the speed and throttle opening at the point Z, which is to the left of the shiftdown line. Then, now the computing control means 40 will be outputting a shiftdown signal, which is an "0" signal, and therefore the NAND gate 47's "1" is maintained, and so the vehicle is maintained in the current operating state, with the sub-transmission 21 in the directly connected stage. On the other hand, suppose that the speed and throttle opening of the vehicle have only changed from those at the point X to those at the point Y in FIG. 3, which is to the right of the shiftdown line. Then, at time point t3 the calculating control system 40 will be outputting a "1" signal, and therefore the output of the NAND gate 47 will be a "0" signal, and therefore the sub-transmission 21 will be shifted up from the directly connected stage to the increasing speed stage.

In the figures, it is further illustrated that the vehicle is suddenly accelerated just after the point on FIG. 3 representing its operating conditions has reached the point Y, so that this point reaches the point Y'. Therefore, at this time, the computing control system 40 outputs a "0" signal, and then the NAND gate 47 outputs a "1" again, and the sub-transmission 21 is shifted down from the increasing speed stage to the direct connection stage.

The amount of electricity supplied per unit time to the condenser 69 may be adjusted as one wishes, by varying the values of the various components of the system, and therefore the time between the above described time points t2 and t3 may be adjusted as one wishes. Therefore, if the brake pedal is released for a short time less than this aforementioned time, the sub-transmission is still maintained in the directly connected stage, and is not upshifted for this brief interval between braking applications. This feature makes for smoothness of operation.

Further, it is illustrated in the figures that the brake pedal is again pushed at time point t4. At this time the voltage B given to the positive terminal of the comparator 61 again begins to decrease, by the reduction of the charge in the condenser 69 as it is discharged through the resistor 67. However, the charge in the condenser 69, by the time point t5 when the brake pedal is released, has not become low enough for the voltage at the terminal of the comparator 61 to be below the threshold voltage, and hence the comparator 61 always maintains its condition of outputting a "1" signal. When the brake pedal is released, at time point t5, then this voltage B increases again to its standard value. In this way, it is arranged that brief applications of the braking system of the vehicle do not trigger downshifting for engine braking. This feature again makes for smoothness in operation.

Therefore, it is seen that, according to the present invention, shift-up and shift-down of the subtransmission of the vehicle is performed automatically, depending on the degree of throttle opening and the speed of the vehicle (although other operating parameters could be used), and at the same time when the brake is applied for more than a certain length of time the subtransmission is positively forced into the directly connected stage, and therefore engine braking is much more effective and positive, and brake wear and driver strain are reduced. Further, short release of the brake pedal does not permit upshifting again, if the brake pedal is then applied again. The utility and simplicity of the present invention are therefore fully manifest, because the embodiment shown requires only the addition of a few simple and cheap electronic components, which make up the engine braking control system 59.

Although the present invention has been shown and described with reference to a particular embodiment thereof, it should not be considered as limited thereto. For instance, although in the shown embodiment the control of the sub-transmission 21 by the computing control means 40 is shown as performed according to the throttle opening of the vehicle and the road speed thereof, other possibilities could be considered. For instance, the engine rotational speed could be used instead of the road speed, and further the flow of intake air might be measured by an intake air flow volume sensor, and this parameter might be used instead of, or as well as, the others. Other changes to the form and the content of any particular embodiment might be made, and it is therefore not intended to be limited to this, however, or mere and simple generalizations, or other detailed embodiments. Yet further, omissions might be made of parts of the shown system, without departing from the scope of the present invention, which it is therefore desired should be limited and defined not by any of the perhaps purely fortuitous details of the drawings and embodiment shown, but solely by the accompanying claims.

We claim:

1. In a vehicle which comprises:
    an engine for supplying rotary power,
    a transmission connected to the engine and having a plurality of speed stages,
    a sub-transmission connected in series with the transmission to receive rotary power from the engine to drive the vehicle, the subtransmission including a higher speed stage for providing a first gearing ratio from its input to its output, and a lower speed stage for providing a second gearing ratio lower than the first gearing ratio,
    and a braking system for generating a braking signal when operated;
    a sub-transmission control system which includes:
    a main control system for automatically controlling the shifting of the sub-transmission between said higher and said lower speed stages depending on ongoing sensed operating parameters of the vehicle; and
    a sub-control system for receiving said braking signal, said sub-control system including means for measuring the duration of said braking signal, means for determining if said measured duration exceeds a first predetermined time, and means for generating an engine braking shiftdown signal only after said determination that said braking signal has continued for more than said first predetermined time;
    said engine braking shiftdown signal being supplied to said main control system to control said main control system to shift the sub-transmission positively into the lower speed stage.

2. A sub-transmission control system, as in claim 1, wherein said sub-control system includes means for continuing said engine braking shiftdown signal for a second predetermined time after cessation of the operation of the braking system of the vehicle, so that, if the braking system of the vehicle is re-operated before the expiration of said second predetermined time, the engine braking shiftdown signal is outputted continuously without a break.

3. A sub-transmission control system, as in claim 1 or 2, wherein said sub-control system comprises a comparator having two inputs, a condenser, an a first resistance, one of the inputs of the comparator being supplied with a certain reference threshhold voltage which is substantially constant, and the other of the inputs of the comparator being supplied with a voltage which is maintained at one terminal of the condenser, said condenser being discharged gradually through the first resistance on operation of the braking system of the vehicle, the value of the first resistance determining the duration of the first predetermined time.

4. A sub-transmission control system as in claim 3, wherein said sub-control system further comprises a second resistance through which the condenser is recharged, the value of said second resistance determining the duration of said second predetermined time.

* * * * *